US007996771B2

(12) United States Patent
Girgensohn et al.

(10) Patent No.: US 7,996,771 B2
(45) Date of Patent: Aug. 9, 2011

(54) METHODS AND INTERFACES FOR EVENT TIMELINE AND LOGS OF VIDEO STREAMS (75) Inventors: Andreas Girgensohn, Palo Alto, CA (US); Frank M. Shipman, College Station, TX (US); Lynn Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 351 days.

(21) Appl. No.: 11/324,971

(22) Filed: Jan. 3, 2006

(65) Prior Publication Data
US 2006/0288288 A1    Dec. 21, 2006

Related U.S. Application Data

(60) Provisional application No. 60/691,830, filed on Jun. 17, 2005, provisional application No. 60/691,983, filed on Jun. 17, 2005, provisional application No. 60/691,899, filed on Jun. 17, 2005.

(51) Int. Cl.
*G06F 3/00* (2006.01)
(52) U.S. Cl. .......................... 715/723; 715/719; 348/143
(58) Field of Classification Search .................. 715/721, 715/723, 719; 348/143
See application file for complete search history.

(56) References Cited

U.S. PATENT DOCUMENTS

| 5,136,655 | A | 8/1992 | Bronson |
| 5,655,058 | A | 8/1997 | Balasubramanian et al. |
| 5,680,558 | A | 10/1997 | Hatanaka et al. |
| 5,708,767 | A | 1/1998 | Yeo et al. |
| 6,366,296 | B1* | 4/2002 | Boreczky et al. ............. 715/719 |
| 6,535,639 | B1* | 3/2003 | Uchihachi et al. ............ 382/225 |
| 6,570,608 | B1* | 5/2003 | Tserng ......................... 348/143 |
| 6,807,361 | B1 | 10/2004 | Girgensohn et al. |
| 7,143,083 | B2 | 11/2006 | Carlbom et al. |
| 7,221,366 | B2 | 5/2007 | Uyttendaele |
| 2003/0025599 | A1* | 2/2003 | Monroe ........................ 340/531 |
| 2003/0044045 | A1 | 3/2003 | Schoepflin |
| 2003/0090505 | A1* | 5/2003 | McGee et al. ................ 345/721 |
| 2003/0161396 | A1 | 8/2003 | Foote et al. |
| 2003/0189588 | A1* | 10/2003 | Girgensohn et al. ......... 345/723 |
| 2003/0197731 | A1 | 10/2003 | Chiu et al. |
| 2003/0234803 | A1* | 12/2003 | Toyama et al. ............... 345/716 |
| 2004/0119819 | A1* | 6/2004 | Aggarwal et al. ............ 348/143 |
| 2004/0240542 | A1* | 12/2004 | Yeredor et al. ........... 375/240.01 |

(Continued)

OTHER PUBLICATIONS

Demirdjian et al., "Activity Maps for Location-Aware Computing," In Proceedings of IEEE Workshop on Applications of Computer Vision (WACV2002), Orlando, Florida (Dec. 2002).

(Continued)

*Primary Examiner* — Tuyetlien T Tran
(74) *Attorney, Agent, or Firm* — Fliesler Meyer LLP (57) ABSTRACT

Techniques for generating timelines and event logs from one or more fixed-position cameras based on the identification of activity in the video are presented. Various embodiments of the invention include an assessment of the importance of the activity, the creation of a timeline identifying events of interest, and interaction techniques for seeing more details of an event or alternate views of the video. In one embodiment, motion detection is used to determine activity in one or more synchronized video streams. In another embodiment, events are determined based on periods of activity and assigned importance assessments based on the activity, important locations in the video streams, and events from other sensors. In different embodiments, the interface consists of a timeline, event log, and map.

17 Claims, 13 Drawing Sheets

U.S. PATENT DOCUMENTS

2005/0122397 A1* 6/2005 Henson et al. .............. 348/143
2005/0132414 A1* 6/2005 Bentley et al. .............. 725/105
2005/0163346 A1* 7/2005 van den Bergen et al. ... 382/103

OTHER PUBLICATIONS

Larson et al., "An exploratory look at supermarket shopping paths," The Wharton School, The University of Pennsylvania, Philadelphia, http://www.searchlores.org/realicra/PT_1006.pdf (Dec. 9, 2005).

Pingali et al., "Multimedia Retrieval through Spatio-Temperal Activity Maps," Proceedings of the ACM Multimedia, pp. 129-136, Ottawa (Sep. 2001).

Porikli, F., "Multi-Camera Surveillance: Object-Based Summarization Approach," Mitsubishi Electric Research Laboratories, Inc., https://www.merl.com/reports/docs/TR2003-145.pdf (Mar. 2004).

Santini, S., "Analysis of traffic flow in urban areas using web cameras" Fifth IEEE Workshop on Applications of Computer Vision (WACV 2000) Palms Spring, CA (Dec. 2000).

Stauffer and Grimson, "Learning Patterns of Activity Using Real-Time Tracking, "IEEE Trans. Pattern Anal. Mach. Intell. 22(8): 747-757 (2000), http://people.csail.mit.edu/welg/papers/learning2000.pdf.

Xiang and Gong, "Activity based video content trajectory representation and segmentation," In Proc. British Machine Vision Conference (BMVC), pp. 177-186, Kingston, U.K, (Sep. 2004), http://www.dcs.qmul.ac.uk/~txiang/xiang_gong_bmvc04_segment_camera_ready.pdf.

"Tag Team: Tracking the Patterns of Supermarket Shoppers," Knowledge@Wharton, The Wharton School of the University of Pennsylvania (Jun. 1, 2005). http://knowledge.wharton.upenn.edu/articlepdf/1208.pdf?CFID=36967030&CFTOKEN=4134849&jsessionid=9a3085e52c58255c797c.

Topic 6 "Analyxing InStore Shopping Patterns," Map Analysis, http://www.innovativegis.com/basis/MapAnalysis/Topic6/Topic6.pdf (accessed Sep. 11, 2007).

Kumar V., et al., "Metadata Visualization for Digital Libraries: Interactive Timeline Editing and Review." Proceedings of the $3^{rd}$ ACM Conference on Digital Libraries, pp. 126-133 (1998).

Yeung, M., et al., "Video Visualization for Compact Presentation and Fast Browsing of Pictorial Content," IEEE Trans. Circuits and Sys. For Video Tech., vol. 7, No. 5 pp. 771-785 (Oct. 1997).

Boreczky, J., et al., "An Interactive Comic Book Presentation for Exploring Video," FX Palo Alto Laboratory, Inc. (1999).

Cheung, S., et al., "Robust Techniques for Background Subtraction in Urban Traffic Video," Center for Applied Scientific Computing (2004).

Girgensohn A., et al., "A Semi-Automatic Approach to Home Video Editing." In Proceedings of UIST '00, ACM Press, pp. 81-89 (2000).

Plaisant, C., et al., "Lifelines: Visualizing Personal Histories," University of Maryland, http://www.cs.umd.edu/projects/hcil (at least as early as Jun. 14, 2005).

Wildemuth, B., "How Fast is Too Fast? Evaluating Fast Forward Surrogates for Digital Video," Interaction Design Laboratory, Proceedings of the $3^{rd}$ ACM/IEEE-CS Joint Conference on Digital Libraries, University of North Carolina at Chapel Hill, pp. 221-230 (2003).

Zivkovic, Z., "Improved Adaptive Gaussian Mixture Model for Background Subtraction," Intelligent and Autonomous Systems Group, University of Amsterdam, The Netherlands (2004).

* cited by examiner

METHODS AND INTERFACES FOR EVENT TIMELINE AND LOGS OF VIDEO STREAMS

PRIORITY CLAIM

This application claims priority under 35 U.S.C. 119(e) to U.S. Provisional Application No. 60/691,830, filed Jun. 17, 2005, entitled METHODS AND INTERFACES FOR EVENT TIMELINES AND LOGS OF VIDEO STREAMS, and to U.S. Provisional Application No. 60/691,983, filed Jun. 17, 2005, entitled METHODS AND INTERFACES FOR VISUALIZING ACTIVITY ACROSS VIDEO FRAMES IN AN ACTION KEYFRAME, and to U.S. Provisional Application No. 60/691,899, filed Jun. 17, 2005, entitled METHOD AND SYSTEM FOR ANALYZING FIXED-CAMERA VIDEO VIA THE SELECTION, VISUALIZATION, AND INTERACTION WITH STORYBOARD KEYFRAMES, each of which is incorporated herein by reference.

CROSS REFERENCE TO RELATED APPLICATIONS

This application is related to the following applications, which were filed concurrently herewith:

(1) U.S. patent application Ser. No. 11/324,557 entitled "Method and System for Analyzing Fixed-Camera Video via the Selection, Visualization, and Interaction with Storyboard Keyframes," by Andreas Girgensohn, et al., filed Jan. 3, 2006; and (2) U.S. patent application Ser. No. 11/324,355 entitled "Methods and Interfaces for Visualizing Activity across Video Frames in an Action Keyframe," by Andreas Girgensohn, et al., filed Jan. 3, 2006, which issued as U.S. Pat. No. 7,623,677 on Nov. 24, 2009.

BACKGROUND OF THE INVENTION

1. Field of the Invention

Techniques for generating timelines and event logs from one or more fixed-position cameras based on the identification of activity in the video, an assessment of the importance of the activity, the creation of a timeline identifying events of interest, and interaction techniques for seeing more details of an event or alternate views of the video are identified.

2. Description of the Related Art

Identifying events of interest within a set of synchronized video streams, such as video from a set of security cameras, is difficult due to the quantity of video and the lack of authored metadata or indexing. Yet, security personnel need to identify, either in real time or after the fact, activities of interest and determine interrelationships between activities in different video streams. They must develop an understanding of the sequence of actions that led to or happened after a particular incident.

Timelines have been explored by a variety of researchers. Plaisant et al. use timelines to visualize events in people's lives (e.g., criminal or medical records), Plaisant C., Milash B., Rose A., Widoff S., Shneiderman B., LifeLines: Visualizing Personal Histories. Proceedings of the SIGCHI conference on Human factors in computing systems, pp. 221-227, 1996. Kumar et al. visualize data from digital libraries such as information about music composers in timelines. Kumar V., Furuta R., Allen R. B., Metadata Visualization for Digital Libraries: Interactive Timeline Editing and Review. Proceedings of the third ACM conference on Digital libraries, pp. 126-133, 1998.

Other approaches are given in Chueng, S.-C. S. and Kamath C. Robust Techniques for Background Subtraction in Urban Traffic Video. Video Communications and Image Processing, SPIE Electronic Imaging, San Jose, 2004.

U.S. Pat. No. 6,366,296 discloses a timeline view for a single camera. U.S. patent application Ser. No. 10/126,555 Publication Number 20030197731 shows a related map technique where keyframes of events fade in and out while the user moves along the timeline.

SUMMARY OF THE INVENTION

A timeline interface for presenting events of interest within a set of video streams has been developed. The timeline interface includes techniques for locating periods of interesting activity within a video stream, methods for grouping activity into events, methods for presenting events, and interface elements for selecting periods of interest and playing through events in a map.

BRIEF DESCRIPTION OF THE DRAWINGS

Preferred embodiments of the present invention will be described in detail based on the following figures, wherein.

DETAILED DESCRIPTION OF THE INVENTION

Identifying Activity in Video

Two different approaches for determining activity are proposed. The first approach compares successive video frames and determines the pixels that change. The second approach models the background of the camera view and determines foreground pixels in every video frame. Both approaches look at the changed or foreground pixels and count them or determine the direction and speed of the overall motion. Frames with sufficient activity are grouped into video segments with activity. Thresholds for the minimum fraction of changed pixels to be considered activity, for the minimum pause in activity to start a new segment, and the minimum length of an activity segment to ignore video noise are experimentally determined.

Turning Activity into Events

Events are identified by determining periods of activity which are considered of interest based on the amount of activity in the video, distance to points of interest in the space being videotaped, detected features such as people's faces, and events from other sensors, e.g., Radio Frequency Identification (RFID). If multiple cameras have the same point of interest in view, the distance measure to the point of interest can be improved by considering all cameras.

Figure 1:
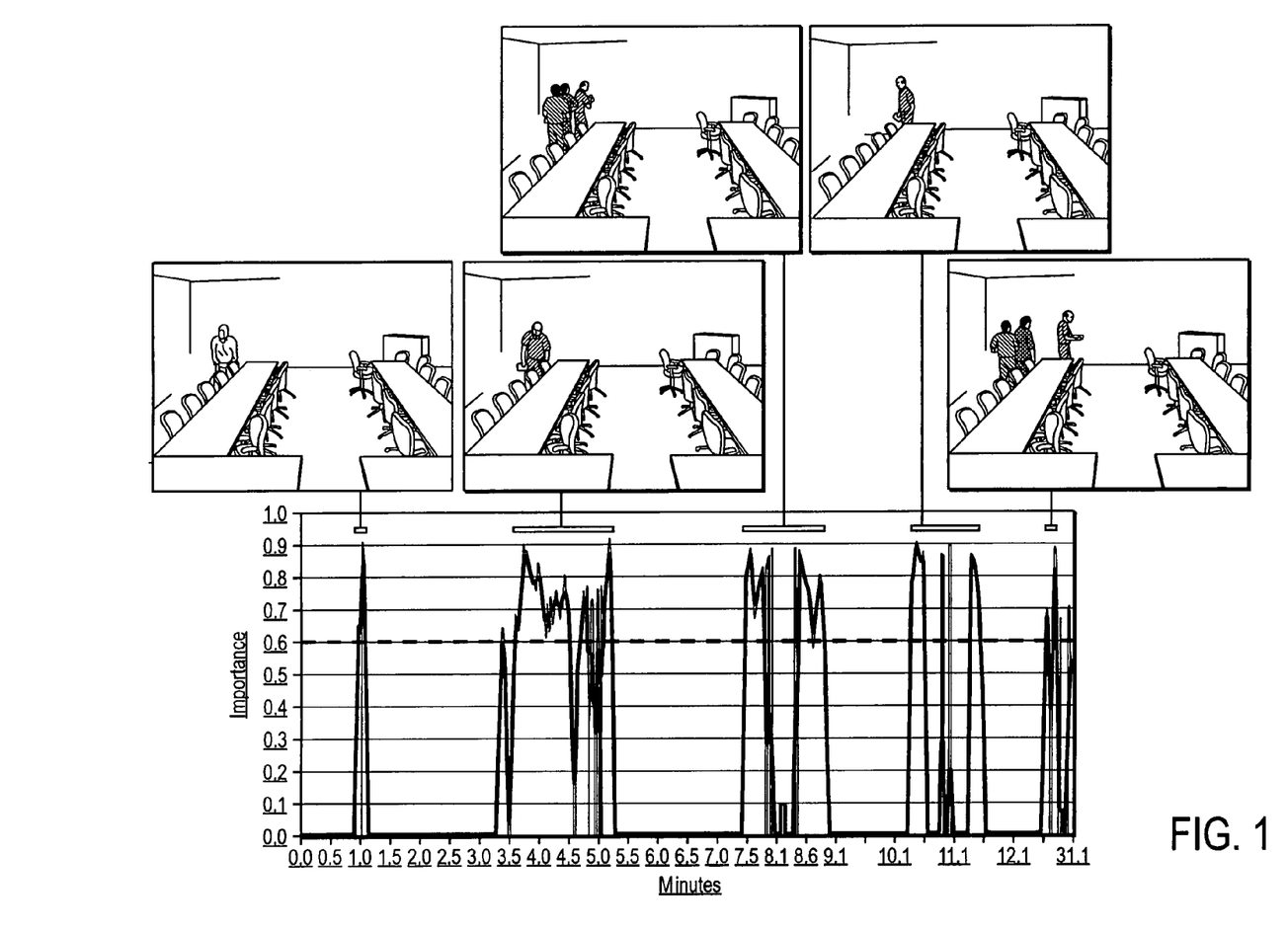
FIG. 1 shows an artists impression of FIG. 8 where a graph of the importance determined from activity close to hot spots versus time is plotted where horizontal lines are used to indicate the time at which the important event was first present in the video stream and extend to the time the event was last present in the video stream and keyframes representative of the activity are displayed, in FIG. 1 the symbols (□, Δ, ◊, O) corresponding to colors (green, red, yellow, blue) are used to indicate the source camera (1, 2, 3, 4) and different hatched line drawings of the characters in FIG. 1 are used to better distinguish the different actors present in FIG. 8.
Figure 8:
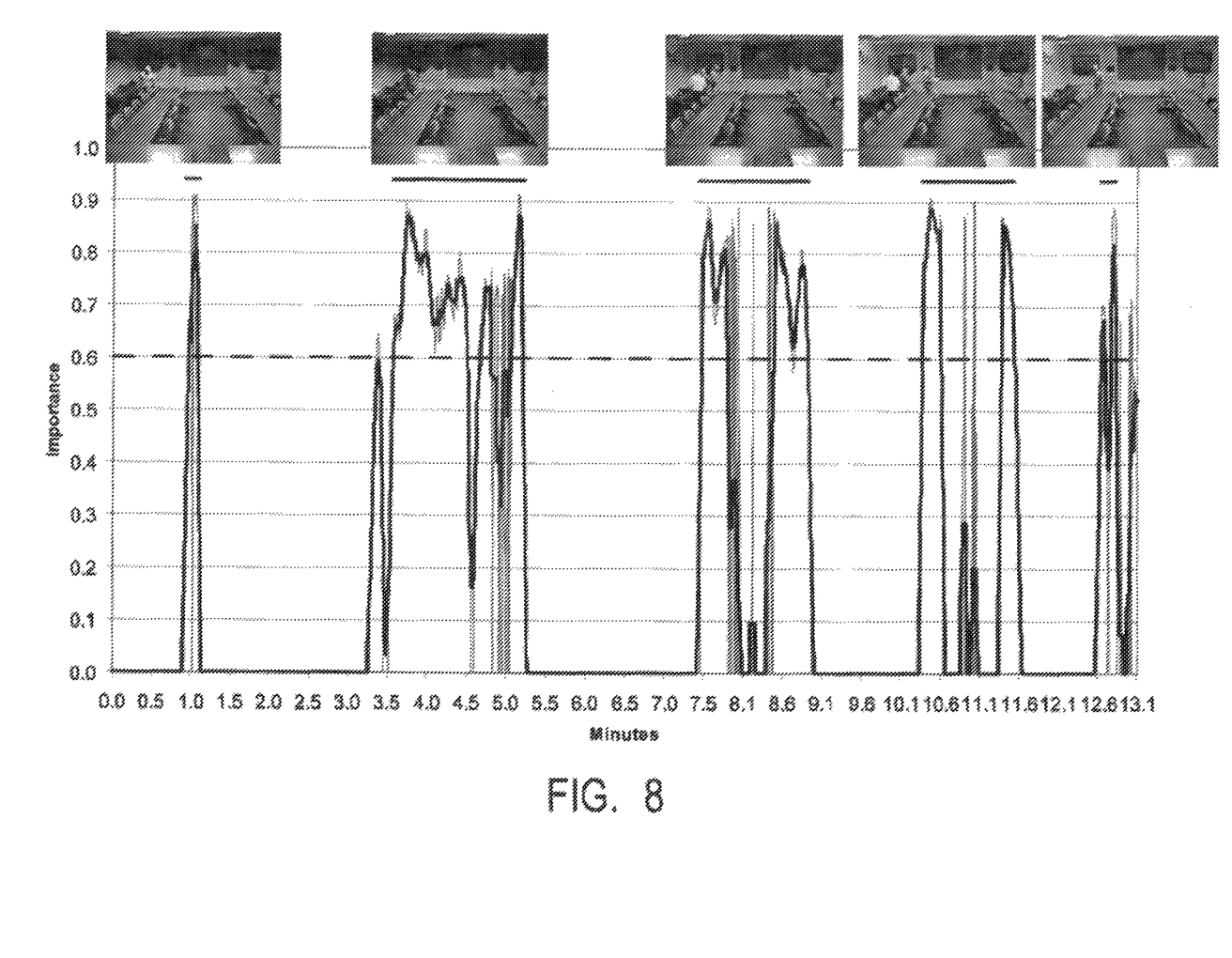
FIG. 8 shows a graph of the importance determined from activity close to hot spots versus time.

Once the measure of interest has been computed for each frame in the video, frames are combined into event sequences by first smoothing the importance score with a moving average, and then selecting sequences where the moving average is above a threshold. This is illustrated in FIG. 1 and FIG. 8, where a graph of the importance, determined from activity close to hot spot, is plotted versus time. In FIGS. 1 and 8, sequences with the moving average above a threshold are grouped into events and events with short gaps are merged. Another threshold determines the maximum duration for gaps for merging events. FIGS. 1 and 8 also depict keyframes with high importance associated with the events.

Visualizing Events on a Timeline

Figure 2:
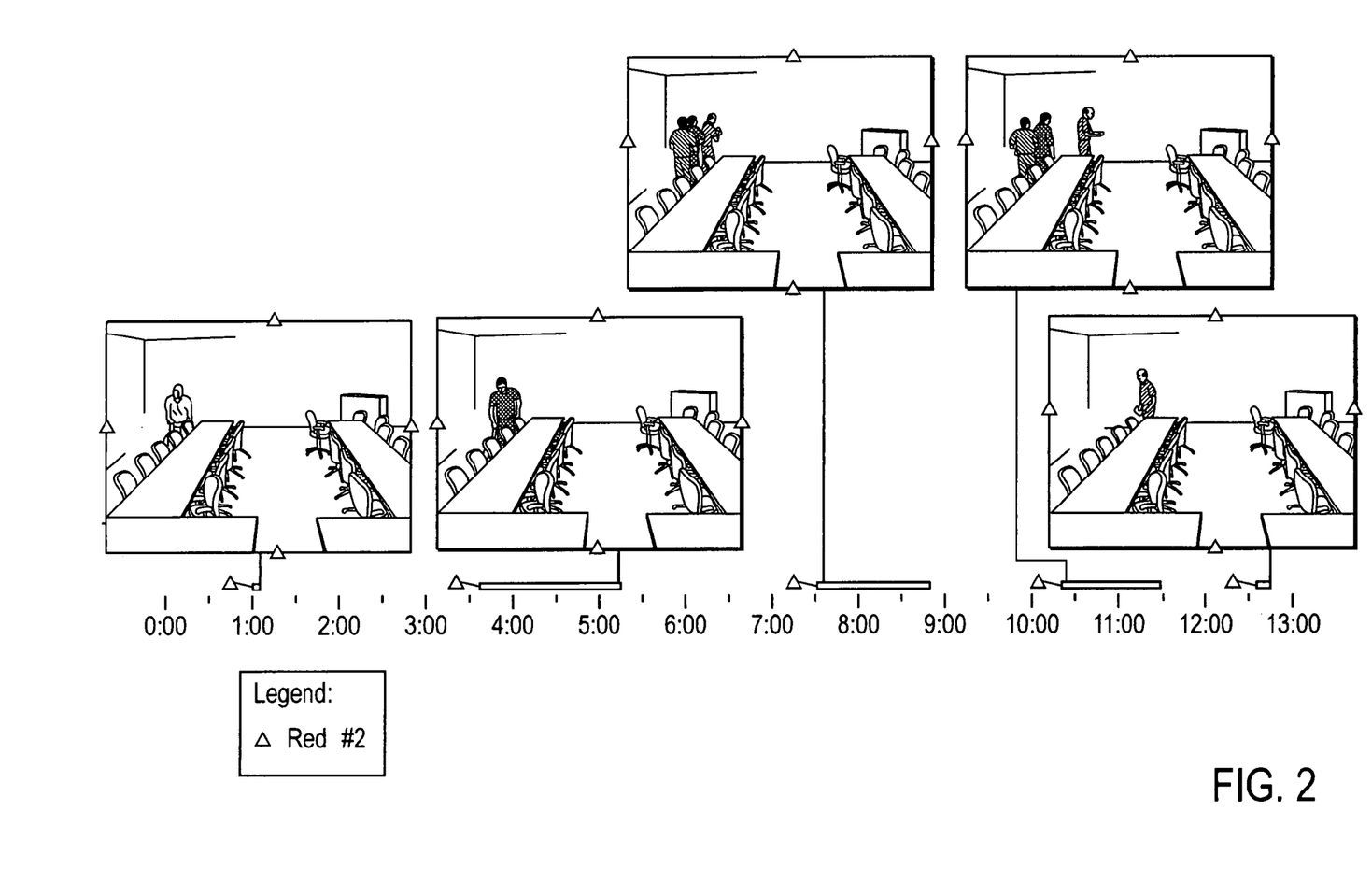
FIG. 2 shows an artists impression of FIG. 9 where a timeline with events from a single source camera (2) indicated in FIG. 2 using the triangle symbol (Δ) to exemplify that the horizontal box and the keyframe outlines in FIG. 9 are shaded red and different hatched line drawings of the characters in FIG. 2 are used to better distinguish the different actors present in FIG. 9.
Figure 3:
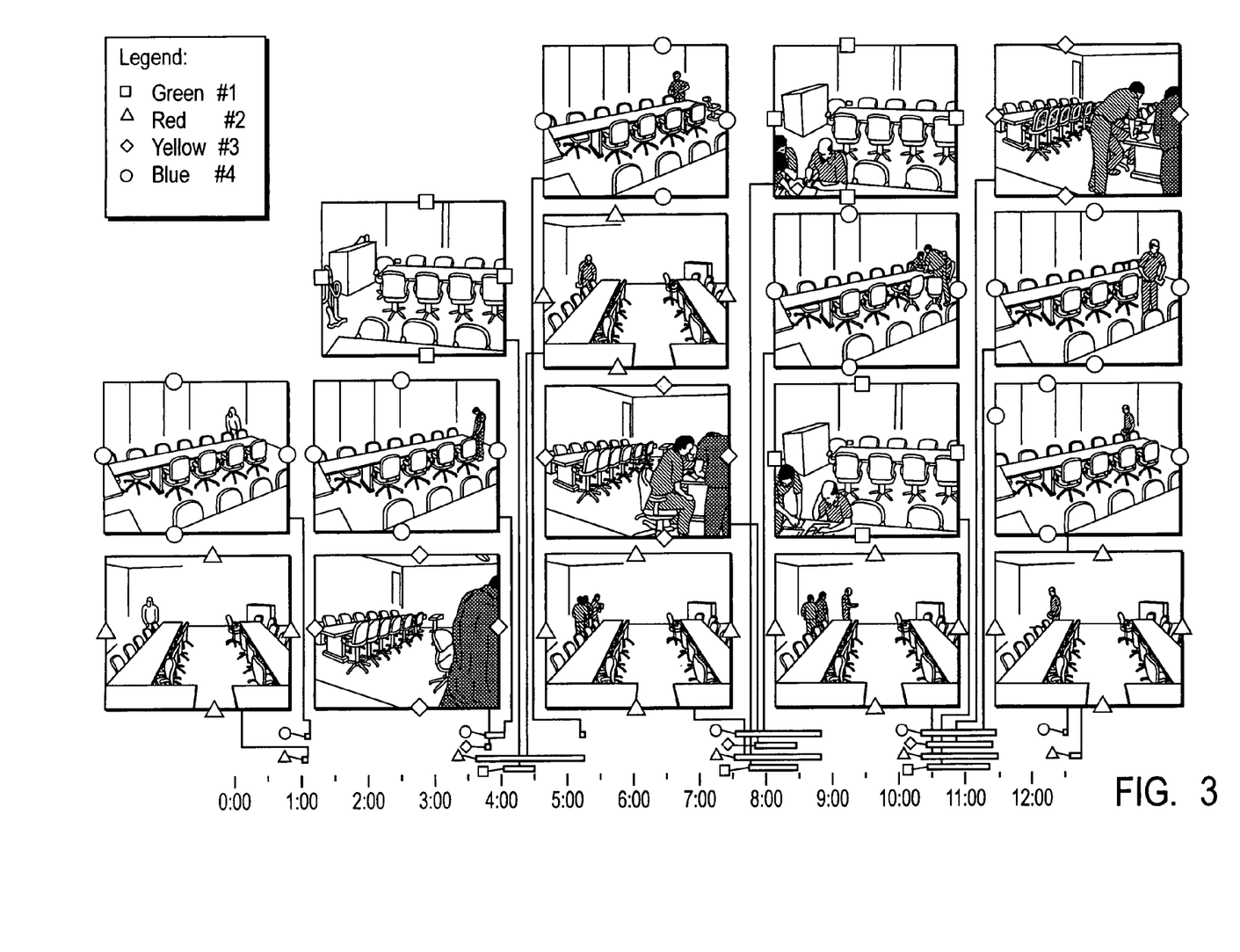
FIG. 3 shows an artists impression of FIG. 10 where a timeline with events from multiple cameras is displayed and keyframes are outlined in FIG. 3 with symbols (□, Δ, ◊, O) corresponding to colors (green, red, yellow, blue) in FIG. 10 to indicate the source camera (1, 2, 3, 4) and different hatched line drawing of the characters in FIG. 3 are used to better distinguish the different actors present in FIG. 10.
Figure 4:
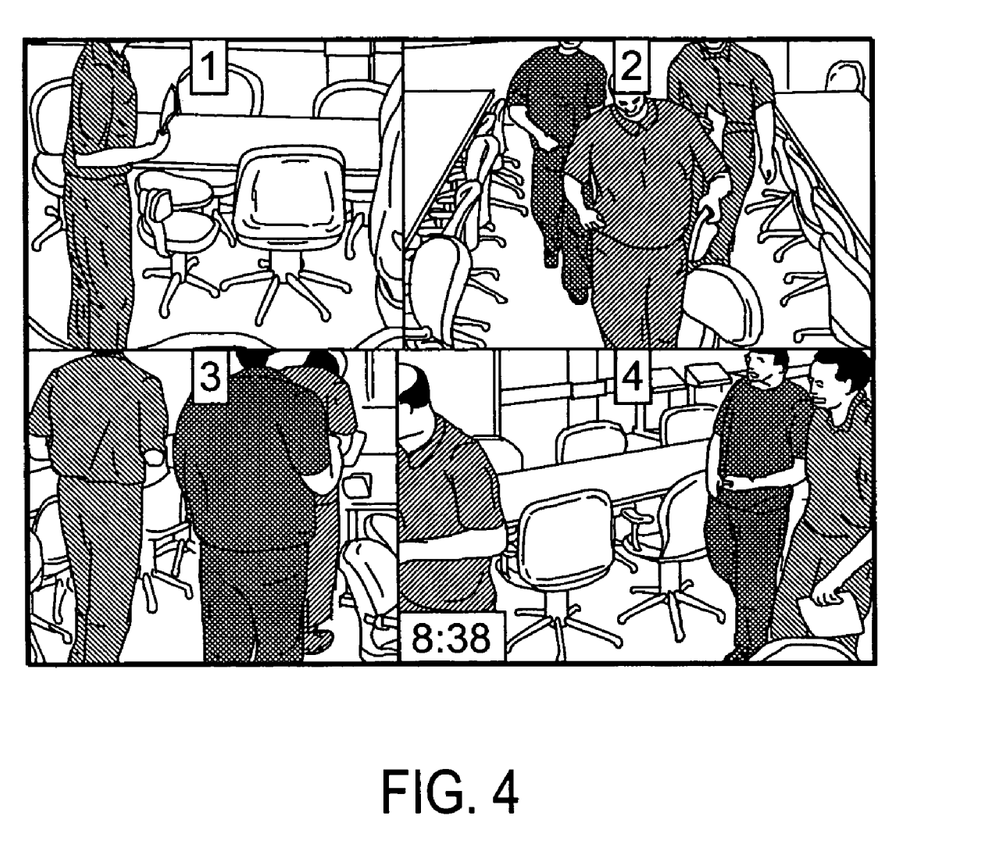
FIG. 4 shows an artists impression of FIG. 11 where a quad representation of keyframes from four cameras is displayed with keyframes cropped to the center of activity and sized proportional to their importance and different hatched line drawings of the characters in FIG. 4 are used to better distinguish the different actors present in FIG. 11.
Figure 7:
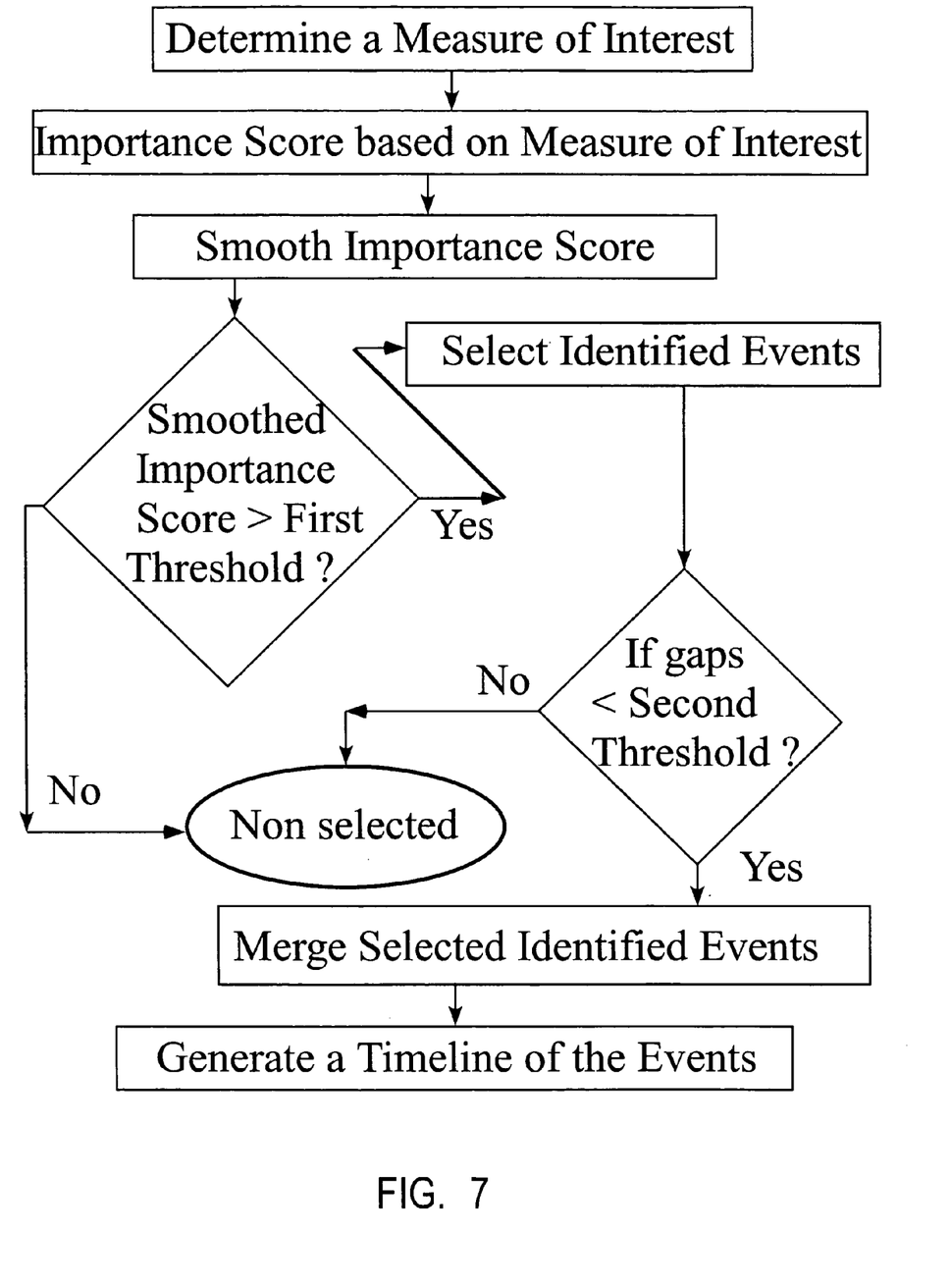
FIG. 7 shows a block diagram of the steps involved in identifying events in a video streams to generate a timeline.
Figure 9:
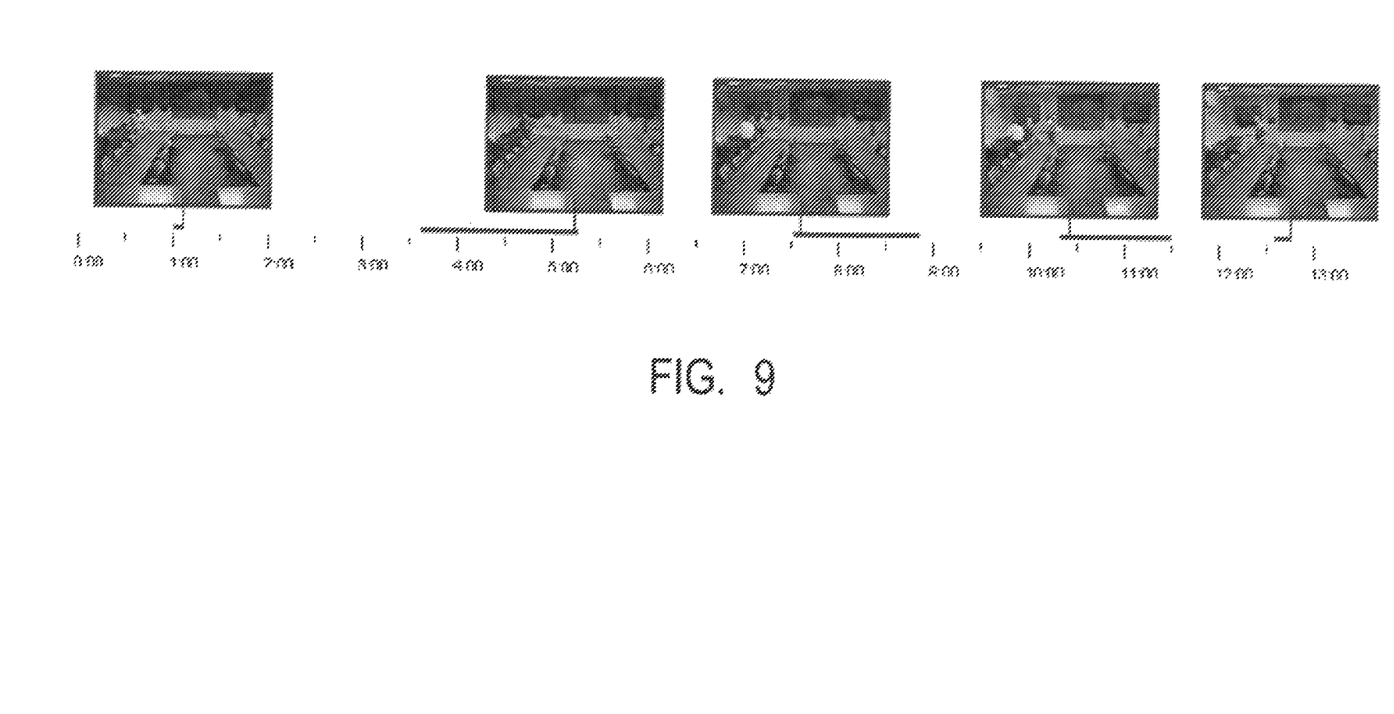
FIG. 9 shows a timeline with events from a single source camera (2)
Figure 10:
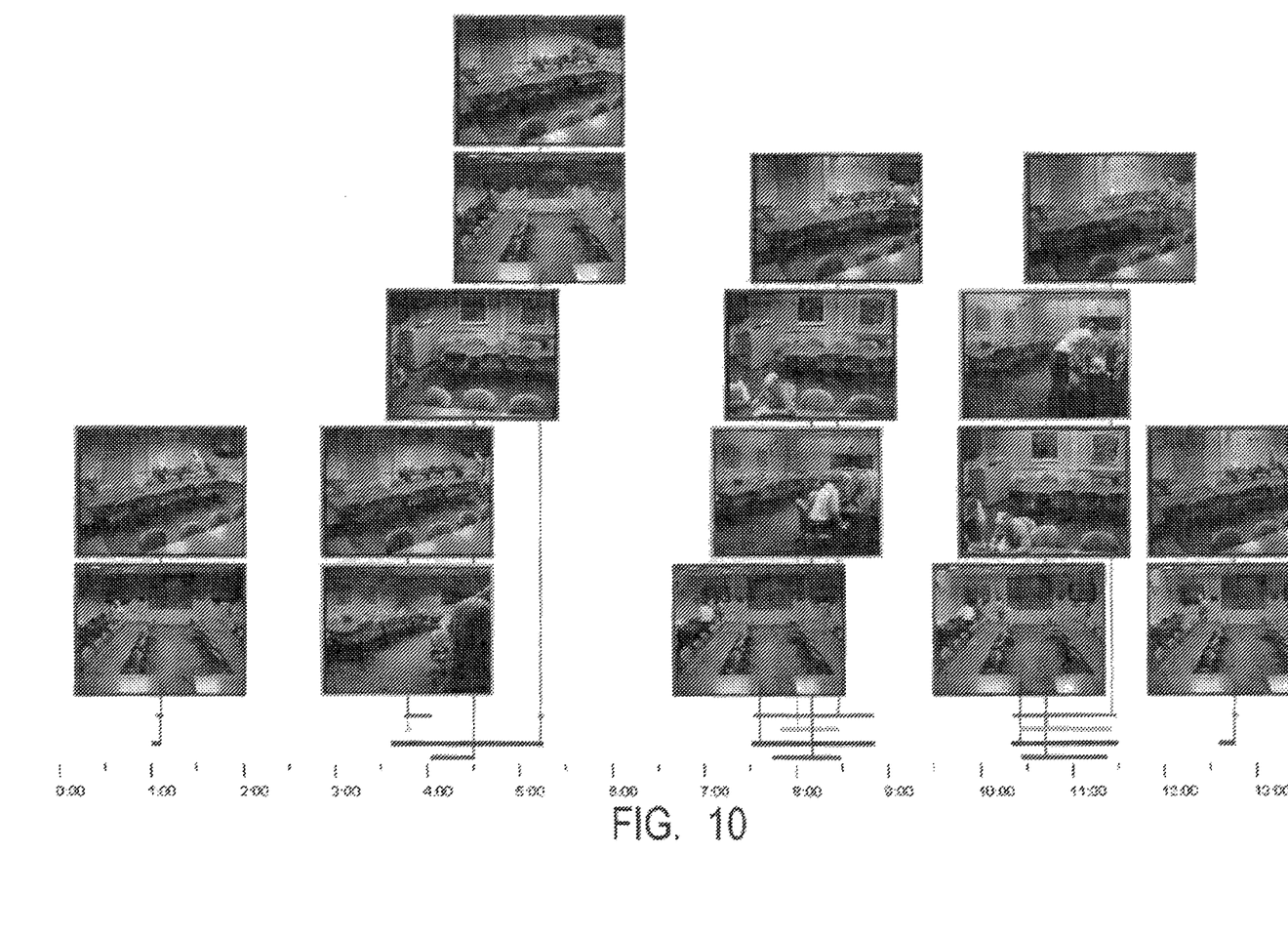
FIG. 10 shows a timeline with events from multiple cameras and keyframes.
Figure 11:
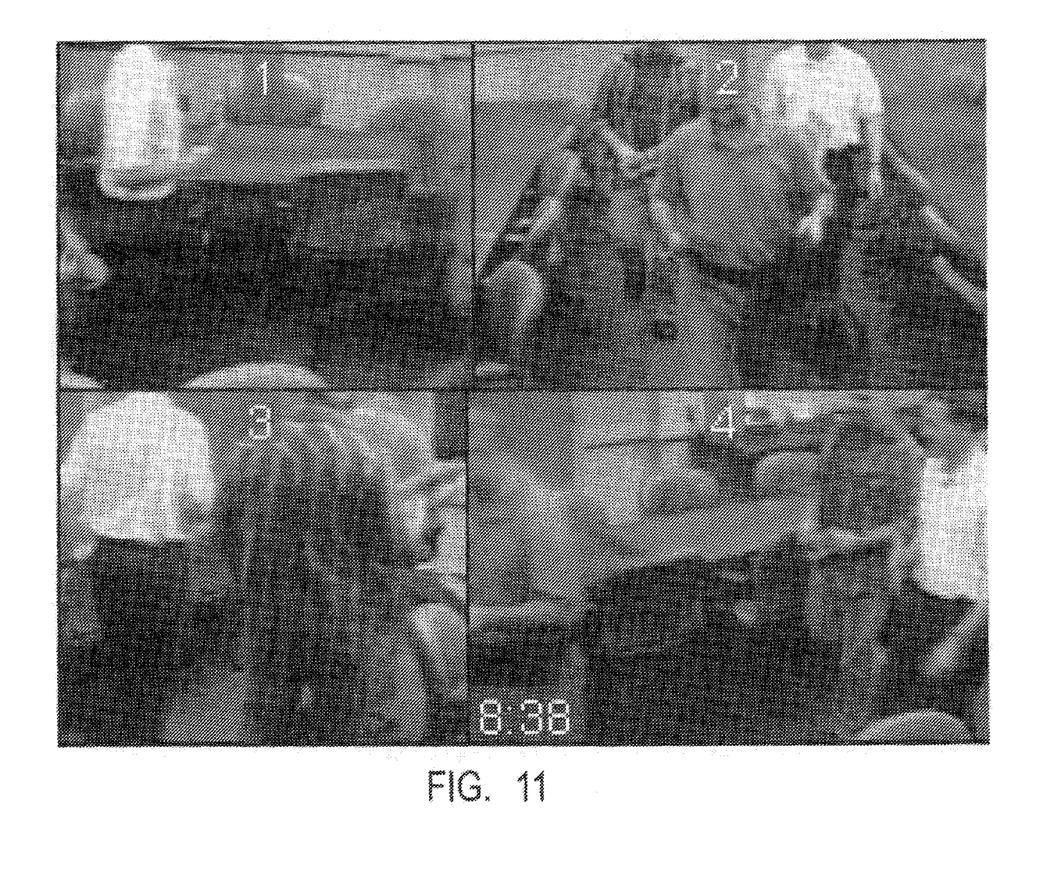
FIG. 11 shows a quad representation of keyframes from four cameras with keyframes cropped to the center of activity and sized proportional to their importance.

Rather than simply providing a list of events, the events are visualized using a timeline and keyframes. FIG. 2 and FIG. 9 show a timeline with events from a single (#2) camera. In FIG. 2 the triangle symbol (Δ) is used to exemplify that the horizontal bar/line and keyframe outlines are shaded red in FIG. 9 to indicate that the video comes from the camera associated with that color. The horizontal bar/lines indicate the duration of the event, and a keyframe is used to visualize the content of each event. Users can adjust the endpoints of the timeline to obtain the time interval of interest. FIG. 7 shows a block diagram of the steps involved in identifying events in video streams to generate a timeline. For multiple cameras, a single timeline is still used, but horizontal bars of different colors indicate events for different cameras. FIG. 3 and FIG. 10 show a timeline with events from multiple cameras. In FIG. 3 keyframe outlines are coded symbols (□, Δ, ◊, O) corresponding to colors (green, red, yellow, blue) in FIG. 10 to indicate the source camera (1, 2, 3, 4). Composite keyframes or activity keyframes are provided to give a sense of the different views of an event and the activity in an event. FIG. 4 and FIG. 11 illustrate a quad representation of keyframes from four cameras with keyframes cropped to the center of activity and sized proportional to their importance.

Interaction with Timeline

Users such as security personnel need to be able to select video streams for inclusion in the timeline. A map interface component has been designed and developed for this purpose. The map and timeline interact to provide the user with the information necessary to locate video segments of interest.

The Map Shows the Geographic Position

The map shows the geographic position of the cameras and is used for selecting video streams to include in the timeline. Cameras are identified using both color-coding and textual camera identifiers. When a user selects a set of cameras with the mouse, the timeline is recreated.

Playback of Events in Map

Figure 6:
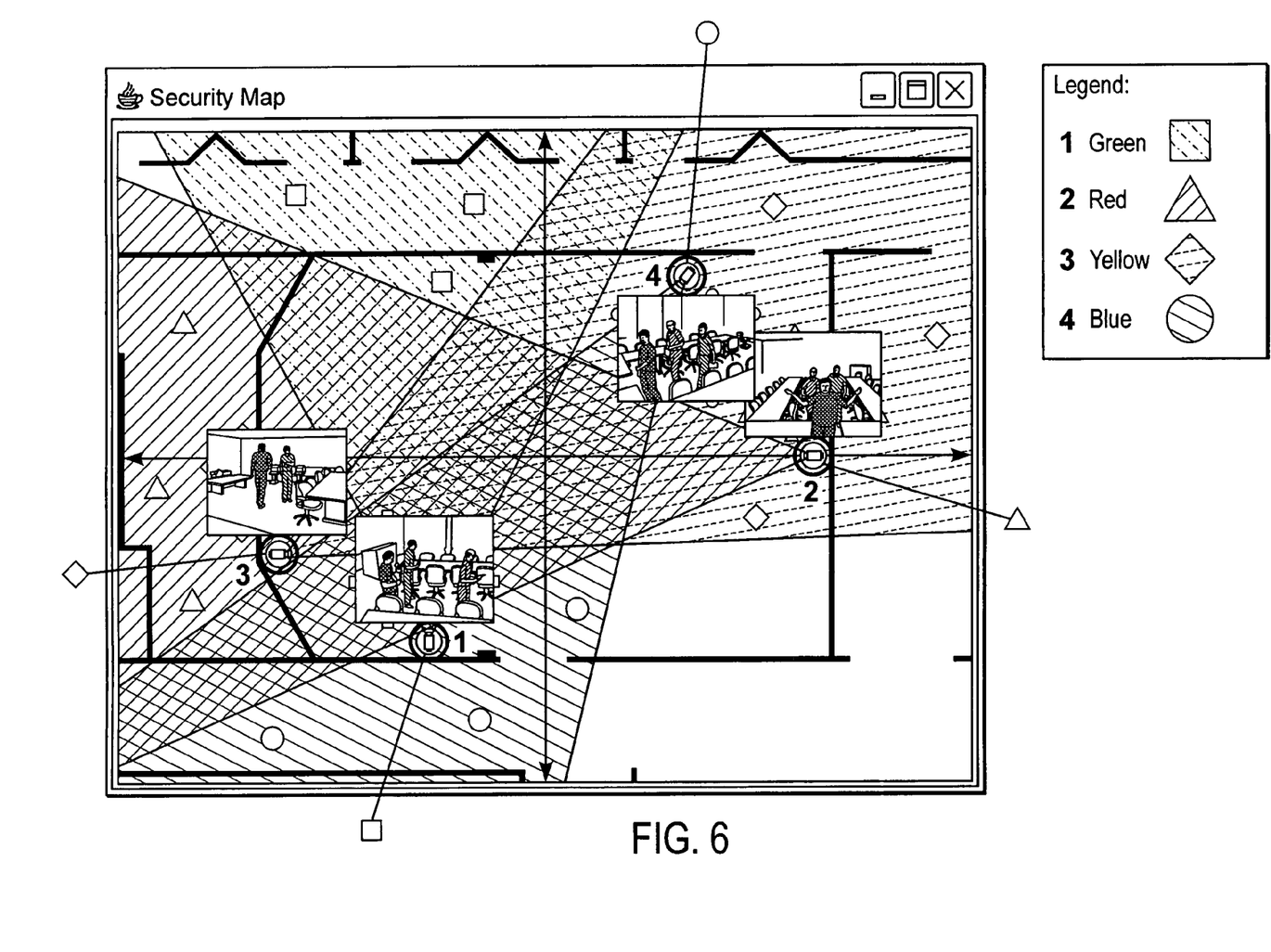
FIG. 6 shows an artists impression of FIG. 13 which illustrates a map showing camera positions identified in FIG. 6 using symbols (□, Δ, ◊, O) corresponding to colors (green, red, yellow, blue) in FIG. 13 to indicate the camera (1, 2, 3, 4) respectively, where keyframes of events fade in and out while the user moves along the timeline (not shown) and different hatched line drawings of the characters in FIG. 6 are used to better distinguish the different actors present in FIG. 13.
Figure 13:
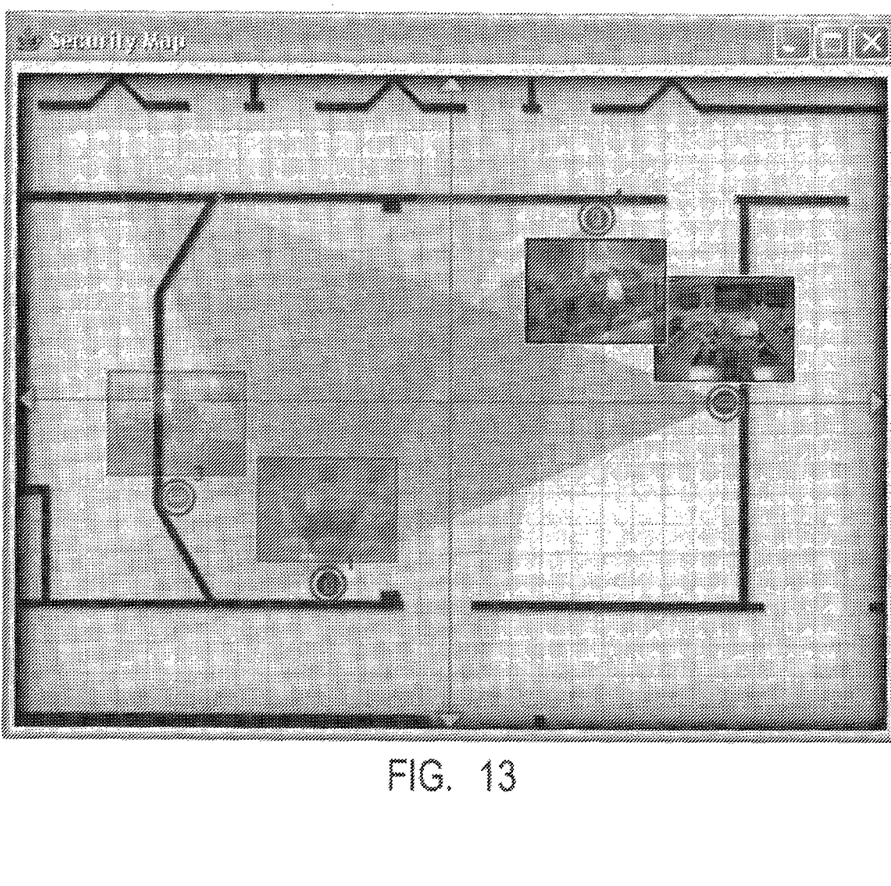
FIG. 13 illustrates a map showing camera positions, where keyframes of events fade in and out while the user moves along the timeline (not shown).

Users can choose to play through a portion of the timeline. During timeline playback, keyframes indicating interesting activity fade into view on the map near the camera showing the activity and fade out after the time of the activity has passed. FIG. 6 and FIG. 13 illustrate a map showing camera positions where keyframes of events fade in and out while the user moves along the timeline (not shown in Figures).

Visualizing Activity in Keyframes

Figure 5:
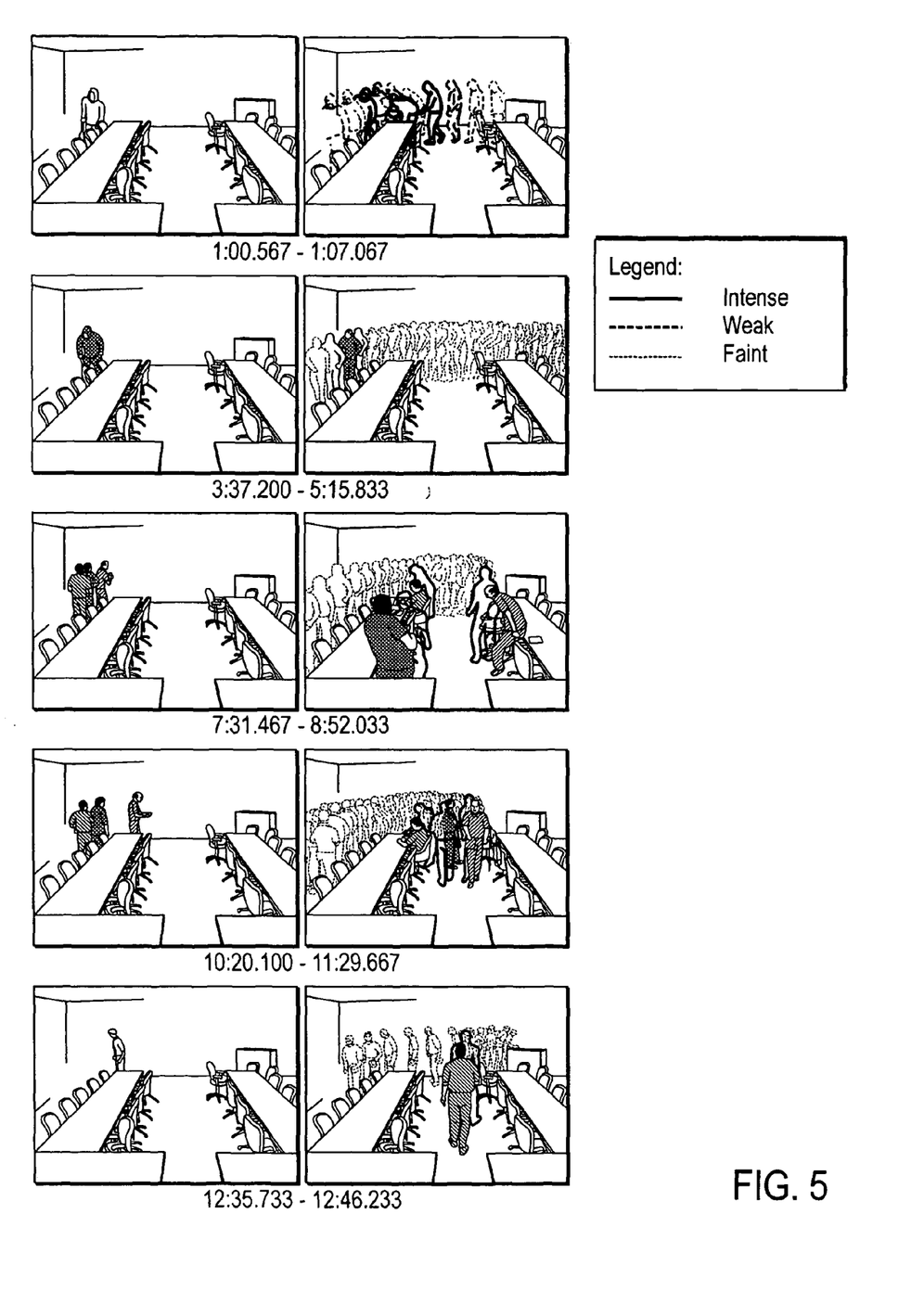
FIG. 5 shows an artists impression of FIG. 12 where an event list and keyframes with activity close to the hotspot and time-lapse visualization of the whole event are displayed, where the intensity of the object in the time lapse visualization in FIG. 5 is indicated using the code (continuous line, dashed line, dotted line) to indicate intense, weak and faint figures and different hatched line drawings of the characters in FIG. 5 are used to better distinguish the different actors present in FIG. 12.
Figure 12:
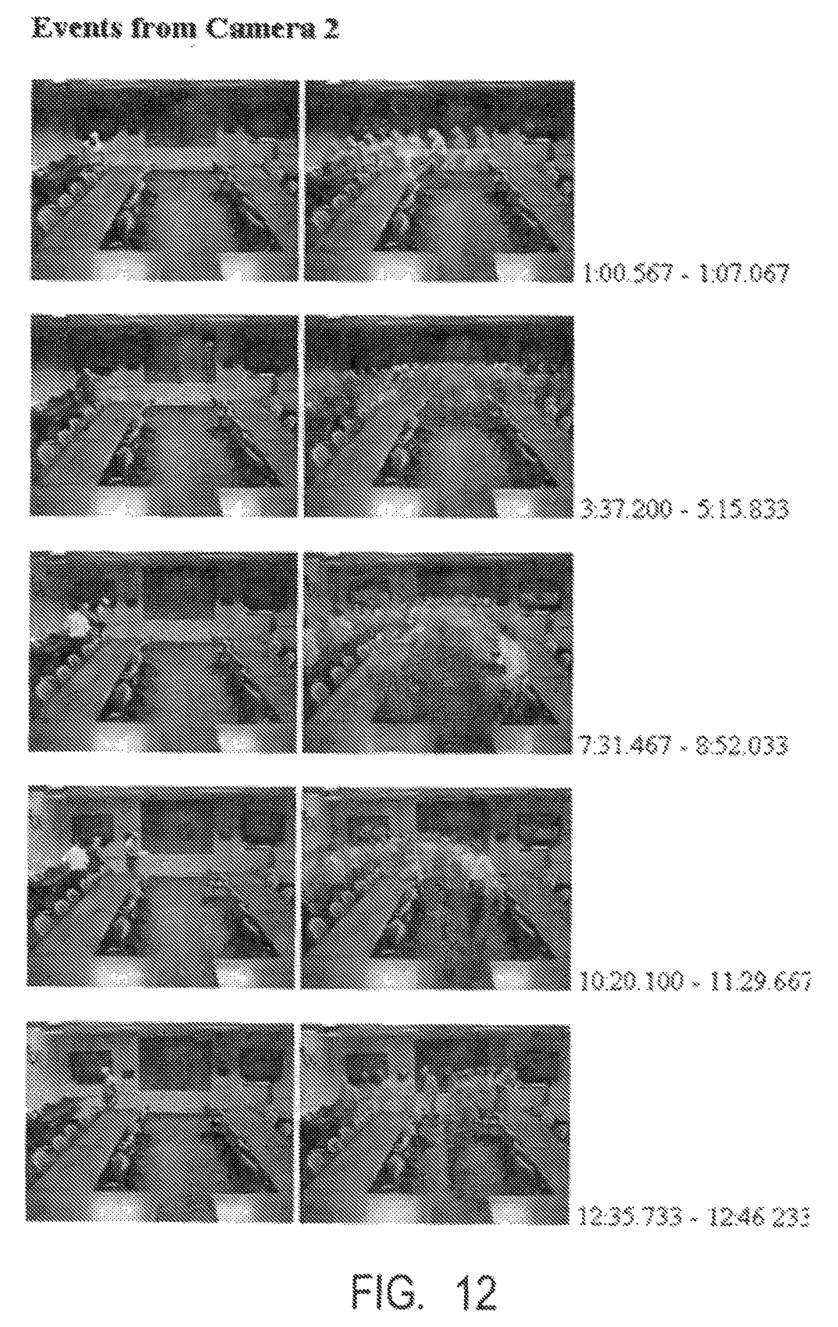
FIG. 12 shows an event list and keyframes with activity close to the hotspot and time-lapse visualization of the whole event.

Action Keyframes. To visualize a period of activity in a video stream via a single keyframe, foreground objects appearing in different frames in the video segment are alpha-blended to show motion. FIG. 5 and FIG. 12 illustrate an event list and keyframes with activity close to the hotspot and time-lapse visualization of the whole event, where in FIG. 5 the intensity of the object in the time lapse visualization is indicated using a code (continuous line, dashed line, dotted line) to indicate intense, weak and faint figures.

Keyframe Compositions. An approach to presenting simultaneous action in multiple video streams can be to create a composition from areas of interest in keyframes from multiple cameras. The size of the regions taken from the source keyframes is used to indicate the relative importance of activity in those video streams (see FIGS. 4 and 11).

Various embodiments of the invention may be implemented using a processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of component circuits, as will be readily apparent to those skilled in the art.

Various embodiments include a computer program product which can be a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy discs, optical discs, DVDs, CD-ROMs, micro drives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information, which can be used by one or more processors to perform any of the features, presented herein. In various embodiments, the transmission may include a plurality of separate transmissions.

Stored on one or more computer readable media, the present disclosure includes software for controlling the hardware of the processor(s), and for enabling the computer(s) and/or processor(s) to interact with a human user or other device utilizing the results of the present invention. Such software may include, but is not limited to, device drivers, interface drivers, operating systems, execution environments/containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers, interface drivers and remote software to do the function. The invocations or calls can include invocations or calls in distributed and client/server systems.

In one embodiment of the invention, a method of identifying events in one or more video streams is envisaged comprising the steps of: (a) determining a measure of interest; (b) generating an importance score for each video frame based on the measure of interest; (c) computing one or more threshold values; and (d) selecting video frames identifying events based on the threshold values.

In another embodiment of the invention, the measure of interest is based on criteria selected from the group consisting of the amount of activity in the video, points of interest in the video, distance to points of interest from the camera, detected features in the video, facial features in the video, if the activity is of interest, if the feature is of interest, activities detected by other sensors and events detected by other sensors.

In another embodiment of the invention, determining the measure of interest further comprises the steps of: (e) determining one or more points of interest in the video stream; (f) determining one or more distances from the one or more video camera positions to the one or more points of interest in the video stream; and (g) determining the measure of interest based on the distances to the points of interest.

In another embodiment of the invention, generating the importance score further comprises the step of smoothing. In another embodiment of the invention, the smoothed importance score is generated by applying a moving average to the importance score.

In another embodiment of the invention, one or more threshold values are computed for measures selected from the group consisting of the minimum measure of interest, the minimum fraction of changed pixels to be considered activity, the minimum pause in activity to start a new video segment and the minimum length of the activity segment to ignore noise.

In another embodiment of the invention, selecting video frames further comprises the steps of: (h) including video frames in the event if the smoothed importance score is above a minimum measure of interest threshold; and (i) merging selected consecutive video frames into a single event if the gap between the selected consecutive video frames is below the minimum pause in activity to start a new video segment threshold value.

Another embodiment of the invention further comprises generating a timeline of at least one of the events in the video stream.

In another embodiment of the invention, the duration of events in the timeline are identified using a horizontal line where the line begins at the time the event was first present in the video stream and ends at the time the event was last present in the video stream; and wherein a keyframe is used to visualize the content of each event; wherein the keyframe is associated with the duration of events.

In another embodiment of the invention, where two or more video streams simultaneously recorded with two or more cameras are represented on a single timeline; where the duration of the event present in each video stream is represented with a horizontal line using a code to indicate the camera used to record the stream; wherein the same code is used for different events present in the video from the same camera; wherein the same code is used to frame the keyframe for each event from the same camera.

In another embodiment of the invention, the code uses different colors to indicate an event shot with a different camera; wherein the same color is used for different events present in the video from the same camera; wherein the same color is used to frame the keyframe for each event from the same camera.

In another embodiment of the invention, a map is used to show the geographic position of two or more cameras used to film the two or more video streams; where a code is used to indicate a camera; where a keyframes is used to show the video stream observed from the camera and is framed in that code; where a different code is used to indicate a different camera; where different keyframes used to show the video stream observed from the different cameras are framed with the different code associated with the different cameras; where the keyframes vary as a cursor moves along the timeline.

In another embodiment of the invention, the code uses different colors to show the geographic position of two or more cameras used to film the two or more video streams; where a color is used to indicate a camera; where the keyframes is framed in that color; where a different color is used to indicate a different camera; where the different keyframes are framed with the different colors associated with the different cameras; where the keyframes vary as a cursor moves along the timeline.

In another embodiment of the invention, keyframes of the identified event are presented; where the keyframes are numbered according to the timeline. In another embodiment of the invention, the keyframes are selected from the group consisting of single action keyframes representative of the period of activity and/or time-lapse visualization of the period of activity. In another embodiment of the invention, keyframes are used to visualize a composition in a video stream; where the keyframes are numbered according to the single timeline.

In another embodiment of the invention, an event-log is used with keyframes on a map to visualize the event.

In another embodiment of the invention, the event is represented using a medium selected from the group consisting of a map, an event-log and a timeline.

In an embodiment of the invention, a program of instructions executable by a computer to generate a timeline of events in a video stream, comprising the steps of: determining a measure of interest; generating an importance score for each video frame based on the measure of interest; computing one or more threshold values; electing video frames identifying events based on the threshold values; and generating a timeline of the one or more events in the video stream.

In another embodiment of the invention, a system or apparatus for generating a timeline of events in a video stream, wherein generating a timeline comprises: a) one or more processors capable of specifying one or more sets of parameters; capable of transferring the one or more sets of parameters to a source code; capable of compiling the source code into a series of tasks for visualizing an event in a video stream; and b) a machine readable medium including operations stored thereon that when processed by one or more processors cause a system to perform the steps of specifying one or more sets of parameters; transferring one or more sets of parameters to a source code; compiling the source code into a series of tasks for generating a timeline of events in a video stream.

In another embodiment of the invention, a machine-readable medium having instructions stored thereon to cause a system to: determine a measure of interest; generate an importance score for each video frame based on the measure of interest; compute one or more threshold values; select video frames identifying events based on the threshold values; and generate a timeline of the one or more events in the video stream.

What is claimed is:

1. A method of identifying and visualizing two or more events in one or more video streams filmed with one or more, cameras, wherein each video stream consists of one or more video frames, comprising the steps of:
   (a) determining a measure of interest, where the measure of interest is selected from the group consisting of amount of activity in the one or more video frames, distance to one or more points of interest in the one or more video frames from one or more camera positions of the one or more camera, activities detected by other sensors and events detected by other sensors;
   (b) generating an importance score for each video frame based on the measure of interest;
   (c) computing one or more threshold values based on the importance scores for each video frame;
   (d) selecting video frames identifying events based on the one or more threshold values; and
   (e) generating a timeline of one or more events in the one or more video stream, wherein the one or more video frames selected are correlated with an event marked on the timeline, wherein a duration of the one or more events in the time line are identified using one or more horizontal lines, wherein each horizontal line begins at the time an event of the one or more events was first present in the one or more video stream and ends at the time the event of the one or more events was last present in the one or more video stream, wherein one or more keyframes are used to visualize content of the one or more events, wherein a code is used to indicate the one or more cameras used to record the one or more video stream, wherein the code is used to frame the one or more keyframes, wherein a map is used to show geographic positions of the one or more cameras on the map, wherein the code is used to indicate the geographic positions of the one or more cameras, wherein the one or more keyframes is located directly adjacent to the geographic positions of the one or more cameras on the map.

2. The method of claim 1, where in step (a) determining the measure of interest further comprises the steps of:
   (f) determining one or more points of interest in the one or more video frames;
   (g) determining one or more distances from the one or more camera positions to the one or more points of interest in the one or more video frames; and
   (h) determining the measure of interest based on the distances from the one or more camera positions to the one or more points of interest in the one or more video frames.

3. The method of claim 1, where in step (b) generating the importance score further comprises the step of smoothing, where in step (d) separate events are not identified when the smoothed importance score does not fall below the one or more threshold values.

4. The method of claim 3, where in step (c) one or more threshold values are computed for measures selected from the group consisting of a minimum pause in activity to start a new video segment and a minimum length of the activity segment to ignore noise.

5. The method of claim 4, where in step (d) selecting video frames further comprises the steps of:
   (i) including video frames in an event if the smoothed importance score is above one or both a minimum measure of interest threshold and the minimum length of the activity segment to ignore noise; and
   (j) merging selected consecutive video frames into a single event if a gap between the selected consecutive video frames is below the minimum pause in activity to start a new video segment threshold value.

6. The method of claim 1, wherein the one or more keyframes are sized proportional to the importance score for the one or more keyframes.

7. The method of claim 1, wherein two or more video streams simultaneously recorded with two or more cameras are represented on a single timeline, wherein the one or more keyframes are cropped to a center of activity.

8. The method of claim 1, wherein the code uses different colors to indicate the one or more cameras on the map, wherein a first color is used for identified events present in the video stream from a first camera, wherein the first color is used to frame the one or more keyframes from the first camera, wherein a second color is used for identified events present in the video stream from a second camera, wherein the second color is used to frame the one or more keyframes from the second camera.

9. The method of claim 1, wherein the keyframes vary as a cursor moves along the timeline.

10. The method of claim 1, wherein the code is used to show a camera viewing angle, wherein a first camera viewing angle is shown in a first color, wherein a second camera viewing angle is shown in a second color.

11. The method of claim 1, wherein the two or more keyframes are selected from time-lapse visualization of the duration of the two or more events.

12. The method of claim 1, wherein the two or more keyframes are used to visualize a composition in the video stream, wherein the two or more keyframes are numbered according to a single timeline.

13. The method of claim 9, wherein an event-log is used with the one or more keyframes on the map to visualize the one or more events.

14. The method of claim 1, wherein multiple video frames are simultaneously displayed in the keyframe to monitor simultaneous activity.

15. A method of generating an area map identifying and visualizing events in two or more video streams filmed with two or more cameras, wherein each video stream consists of video frames, comprising the steps of:
(a) determining a measure of interest;
(b) generating an importance score for each video frame based on the measure of interest;
(c) computing one or more threshold values based on the importance score for each video frame;
(d) selecting video frames identifying events based on the one or more threshold values, wherein selected video frames are displayed in a keyframe to visualize content of events from each of the two or more cameras; and
(e) generating the area map, wherein the area map is used to show geographic positions of the two or more cameras, wherein a first color is used to indicate a geographic position of a first camera, wherein a second color is used to indicate a geographic position of a second camera, wherein the area map displays the keyframe observed from the two or more cameras, wherein the keyframe frame is located adjacent to the geographic positions of the two or more cameras on the area map, wherein a viewing angle of the first camera is shown in the first color, wherein a viewing angle of a second camera is shown in the second color.

16. A method of generating an area map identifying and visualizing events in two or more video streams, each video stream consisting of video frames filmed with two or more cameras comprising the steps of:
(a) determining a measure of interest;
(b) generating an importance score for each video frame based on the measure of interest;
(c) computing one or more threshold values based on the importance score for each video frame;
(d) selecting video frames identifying events based on the one or more threshold values, wherein the video frames selected are part of a video stream of the two or more video streams and the method further comprises generating a timeline of at least one of the events in the video stream, wherein two or more keyframes are used to visualize the events from each of the two or more cameras; and
(e) generating the area map, wherein the area map is used to show geographic positions of the two or more cameras on the area map used to film the two or more video streams, wherein the area map displays the two or more keyframes observed from the two or more cameras, wherein the two or more keyframes are located directly adjacent to the geographic positions of the two or more cameras on the area map, wherein the two or more keyframes vary as a cursor moves along the timeline, wherein the area map shows a camera viewing angle for the two or more cameras, wherein a code is used to indicate the geographic positions of the two or more cameras.

17. A method of generating a single timeline to assist in identifying and visualizing events of interest in two or more video streams simultaneously recorded with two or more cameras, comprising the steps of:
(a) determining a measure of interest;
(b) generating an importance score for one or more video frames in the two or more video stream based on the measure of interest;
(c) computing one or more threshold values;
(d) selecting video frames identifying events based on the one or more threshold values;
(e) generating a timeline displaying one or more keyframes used to visualize one or more identified events in the two or more video streams, wherein the one or more keyframes are displayed adjacent to the timeline, wherein the one or more keyframes are correlated with an event marked on the timeline, wherein a duration of the one or more identified events in the timeline are identified using one or more horizontal lines, wherein each line begins at the time an event was first present in the two or more video streams and ends at the time the event was last present in the two or more video streams, wherein the one or more keyframes are sized proportional to the importance score for the one or more keyframe; and
(f) generating an area map, wherein the area map is used to show geographic positions of the two or more cameras, wherein a first code is used to indicate a geographic position of a first camera, wherein a second code is used to indicate a geographic position of a second camera, wherein the first code is used to identify the one or more keyframe for each identified event from the first camera, wherein the second code is used to indicate the one or more keyframe for each identified event from the second camera, wherein a first camera viewing angle is shown in the first code, wherein a second camera viewing angle is shown in the second code.

* * * * *